US012043528B2

United States Patent
Qiao et al.

(10) Patent No.: US 12,043,528 B2
(45) Date of Patent: Jul. 23, 2024

(54) CHASSIS ASSEMBLY AND AUTOMATIC GUIDED VEHICLE

(71) Applicant: BEIJING JINGDONG QIANSHI TECHNOLOGY CO., LTD., Beijing (CN)

(72) Inventors: Longlong Qiao, Beijing (CN); Ying Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/555,655

(22) PCT Filed: Apr. 1, 2022

(86) PCT No.: PCT/CN2022/084864
§ 371 (c)(1),
(2) Date: Oct. 16, 2023

(87) PCT Pub. No.: WO2023/284334
PCT Pub. Date: Jan. 19, 2023

(65) Prior Publication Data
US 2024/0190686 A1 Jun. 13, 2024

(30) Foreign Application Priority Data
Jul. 16, 2021 (CN) .......................... 202110810501.6

(51) Int. Cl.
*B66F 9/06* (2006.01)
*B66F 7/14* (2006.01)
*B66F 7/28* (2006.01)

(52) U.S. Cl.
CPC .................. *B66F 7/28* (2013.01); *B66F 7/14* (2013.01); *B66F 9/063* (2013.01)

(58) Field of Classification Search
CPC .............. B66F 7/28; B66F 7/14; B66F 9/063
See application file for complete search history.

(56) References Cited

U.S. PATENT DOCUMENTS 2,659,937 A * 11/1953 Hammer ................... B66F 7/18
137/234.6
4,230,330 A * 10/1980 Muhammad ........... A63C 17/01
280/87.042
(Continued)

FOREIGN PATENT DOCUMENTS

| AU | 2012205227 A1 | 8/2012 |
| CN | 105501794 A | 4/2016 |

(Continued)

OTHER PUBLICATIONS

"International Search Report and Written Opinion of the International Searching Authority", with translation of ISR, International Application No. PCT/CN2022/084864, Jun. 24, 2022, 12 pp.
(Continued)

*Primary Examiner* — Michael A Riegelman
(74) *Attorney, Agent, or Firm* — Myers Bigel, P.A.

(57) ABSTRACT

A chassis assembly includes: a chassis; a lifting connecting rod assembly arranged on the chassis; and a lifting power assembly, including a lifting bracket pivotally connected to one end of the lifting connecting rod assembly and a lifting drive mechanism arranged on the chassis and connected to the lifting bracket, wherein the lifting bracket includes a sleeve portion having a cylindrical hollow cavity; the lifting drive mechanism includes: a lead screw penetrating through the sleeve portion, a screw nut fixed to the sleeve portion and in thread fit with the lead screw, and a power output unit drivingly connected to the lead screw; and the power output unit is configured to cause the lead screw to rotate to drive the screw nut and the lifting bracket to rise or fall synchro- (Continued)

nously relative to the chassis. An automatic guided vehicle having the chassis assembly is included.

19 Claims, 4 Drawing Sheets

(56) References Cited

U.S. PATENT DOCUMENTS

| | | | | |
|---|---|---|---|---|
| 5,727,644 | A * | 3/1998 | Roberts | B62D 7/026 |
| | | | | 180/409 |
| 7,073,634 | B2 * | 7/2006 | Mitchell | B65G 1/0492 |
| | | | | 187/414 |
| 7,464,951 | B2 * | 12/2008 | Coray | B62K 5/027 |
| | | | | 280/282 |
| 9,731,896 | B2 * | 8/2017 | Elazary | B66F 9/063 |
| 11,059,707 | B2 * | 7/2021 | Chow | B66F 9/0755 |
| 11,261,069 | B2 * | 3/2022 | Chow | B66F 9/24 |
| 2005/0285381 | A1 * | 12/2005 | Coray | B62K 5/027 |
| | | | | 280/771 |
| 2012/0321423 | A1 * | 12/2012 | MacKnight | H01L 21/67276 |
| | | | | 414/664 |
| 2016/0209847 | A1 * | 7/2016 | Kuegle | B66F 9/07586 |
| 2016/0231751 | A1 * | 8/2016 | Mecklinger | B66F 9/063 |
| 2018/0099811 | A1 * | 4/2018 | Shen | B66F 3/08 |
| 2019/0193691 | A1 * | 6/2019 | He | B62D 65/18 |
| 2020/0198946 | A1 * | 6/2020 | Chow | B65G 1/0492 |
| 2020/0406733 | A1 * | 12/2020 | Yamamoto | B60L 15/20 |
| 2022/0024738 | A1 * | 1/2022 | Le Polotec | G05D 1/0293 |
| 2022/0306209 | A1 * | 9/2022 | Qiao | B62D 61/10 |
| 2022/0306440 | A1 * | 9/2022 | Qiao | B66F 7/0633 |
| 2023/0339098 | A1 * | 10/2023 | Chien | B25J 5/02 |
| 2024/0034216 | A1 * | 2/2024 | Chen | B60P 1/02 |

FOREIGN PATENT DOCUMENTS

| | | |
|---|---|---|
| CN | 111099517 A | 5/2020 |
| CN | 210683089 U | 6/2020 |
| CN | 211393757 U | 9/2020 |
| CN | 111776987 A | 10/2020 |
| CN | 212893697 U | 4/2021 |
| CN | 113023620 A | 6/2021 |
| CN | 215705911 U | 2/2022 |
| WO | 2005039956 A2 | 5/2005 |
| WO | 2020029505 A1 | 2/2020 |

OTHER PUBLICATIONS

First Office Action and English language translation, CN Application No. 202110810501.6, May 25, 2024, 16 pp.

* cited by examiner

CHASSIS ASSEMBLY AND AUTOMATIC GUIDED VEHICLE

CROSS-REFERENCE TO RELATED APPLICATIONS

The present application is a U.S. National Stage Application under 35 U.S.C. § 371 of International Patent Application No. PCT/CN2022/084864, filed on Apr. 1, 2022, which is based on and claims priority to CN Patent Application No. 202110810501.6 filed on Jul. 16, 2021, the disclosure of both of which are incorporated herein by reference in their entireties.

TECHNICAL FIELD

The present disclosure relates to the field of material transportation, and in particular to a chassis assembly and an automatic guided vehicle (Automatic Guided Vehicle, AGV).

BACKGROUND

In material handling scenarios, AGVs are more and more widely used, especially in scenarios where materials or material carriers are lifted and lowered. In some related technologies, a ring gear is used to drive a gear to rotate, and then the gear drives a lead screw to rotate relative to a screw nut fixedly connected to a chassis, so that the lead screw drives components connected to the lead screw to perform a lifting action.

SUMMARY

In one aspect of the present disclosure, provided is a chassis assembly, including: a chassis; a lifting connecting rod assembly arranged on the chassis; and a lifting power assembly, including a lifting bracket pivotally connected to one end of the lifting connecting rod assembly and a lifting drive mechanism arranged on the chassis and connected to the lifting bracket, wherein the lifting bracket includes a sleeve portion having a cylindrical hollow cavity; the lifting drive mechanism includes: a lead screw penetrating through the sleeve portion, a screw nut fixed to the sleeve portion and in thread fit with the lead screw, and a power output unit drivingly connected to the lead screw; and the power output unit is configured to cause the lead screw to rotate to drive the screw nut and the lifting bracket to rise or fall synchronously relative to the chassis.

In some embodiments, the lifting connecting rod assembly includes: a first connecting rod set, including two first connecting rods pivotally connected by a first connecting rod shaft and rotatably connected to the chassis; a second connecting rod set, including two second connecting rods pivotally connected by a second connecting rod shaft and rotatably connected to the chassis; a support base having a first end pivotally connected to the first connecting rod set and a second end pivotally connected to the second connecting rod set; and a push-pull rod having one end pivotally connected to the first connecting rod shaft and the other end pivotally connected to the second connecting rod shaft; wherein the lifting bracket is rotatably connected to the first end of the support base and is configured to apply a force to the first end of the support base to cause the first end of the support base to move in a vertical direction and also to drive the second end of the support base to move in the vertical direction through the two first connecting rods, the push-pull rod and the two second connecting rods; a length of each second connecting rod is not less than that of each first connecting rod, and a total length of the two second connecting rods is greater than that of the two first connecting rods.

In some embodiments, the lifting connecting rod assembly further includes: a first connecting rod shaft fixing base, fixedly arranged on the chassis and pivotally connected to the first connecting rod set through a first connecting shaft; and a second connecting rod shaft fixing base, fixedly arranged on the chassis, located on a side of the first connecting rod shaft fixing base away from the lifting power assembly, and pivotally connected to the second connecting rod set through a second connecting shaft.

In some embodiments, the first end of the support base is pivotally connected to the first connecting rod set through a third connecting rod shaft, and the lifting bracket is pivotally connected to the third connecting rod shaft, so as to realize a rotatable connection between the lifting bracket and the first end of the support base.

In some embodiments, a difference between the length of each second connecting rod and the length of each first connecting rod is 2 mm to 4 mm.

In some embodiments, a distance between the first connecting rod shaft and the second connecting rod shaft is greater than a distance between the first connecting shaft and the second connecting shaft.

In some embodiments, a difference between the distance between the first connecting rod shaft and the second connecting rod shaft and the distance between the first connecting shaft and the second connecting shaft is 1.8 mm to 3.8 mm.

In some embodiments, the chassis is a split structure including a first chassis split portion and a second chassis split portion, the first chassis split portion is pivotally connected to the second chassis split portion through a chassis shaft; the first connecting rod shaft fixing base is fixedly arranged on the first chassis split portion, and the second connecting rod shaft fixing base is fixedly arranged on the second chassis split portion.

In some embodiments, the chassis assembly further includes: two sets of driving wheel trains, fixedly arranged on the chassis and driven independently; and a universal wheel set, floatably arranged below the chassis.

In some embodiments, the driving wheel train includes: a first base, fixedly connected to the chassis; a first motor, fixedly connected to the first base; a hub reducer, connected to the first base and connected to a power output end of the first motor; and a driving wheel, fixedly connected to the hub reducer.

In some embodiments, axes of the driving wheels of the two sets of driving wheel trains are coincident and are parallel to the chassis shaft.

In some embodiments, the universal wheel set includes: at least two universal wheels, having one part located below the first chassis split portion and the other part located below the second chassis split portion.

In some embodiments, the lifting bracket further includes: two flank portions, fixedly connected to or integrally formed with the sleeve portion and located on two sides of the sleeve portion; and two lifting lugs respectively fixedly connected to or integrally formed with the two flank portions and pivotally connected to one end of the lifting connecting rod assembly through the third connecting rod shaft.

In some embodiments, the lifting power assembly further includes: a linear guide mechanism, arranged between the lifting bracket and the chassis and configured to guide the lifting bracket to rise or fall in a straight line.

In some embodiments, the linear guide mechanism includes: two linear rails, respectively fixedly arranged on the two flank portions; and two sets of linear sliders, both fixedly connected with the chassis and respectively in guiding fit with the two linear rails.

In some embodiments, the power output unit includes: a second motor, fixedly connected to the chassis; and a transmission gear train, arranged in the chassis; wherein an input end of the transmission gear train is connected with a power output shaft of the second motor, and an output end of the transmission gear train is connected with the lead screw.

In some embodiments, the chassis assembly further includes: a rotating mechanism, connected to the lifting connecting rod assembly and configured to realize a slewing action of a material carried by the chassis assembly.

In some embodiments, the rotating mechanism includes: a slewing bearing, rotatably arranged at a top of the support base; a driving gear, engaged with gear teeth of the slewing bearing and mounted at the top of the support base; and a third motor, drivingly connected to the driving gear and mounted below the support portion.

In an aspect of the present disclosure, provided is an automatic guided vehicle, including: the chassis assembly described above.

BRIEF DESCRIPTION OF THE DRAWINGS

The accompanying drawings, which constitute a part of this specification, illustrate the embodiments of the present disclosure and together with the description serve to explain the principles of the present disclosure.

The present disclosure can be more clearly understood from the following detailed description with reference to the accompanying drawings, in which.

It should be understood that the dimensions of the various parts shown in the drawings are not given to actual scale. Furthermore, the same or similar reference numerals denote the same or similar components.

DETAILED DESCRIPTION

Figure 1:
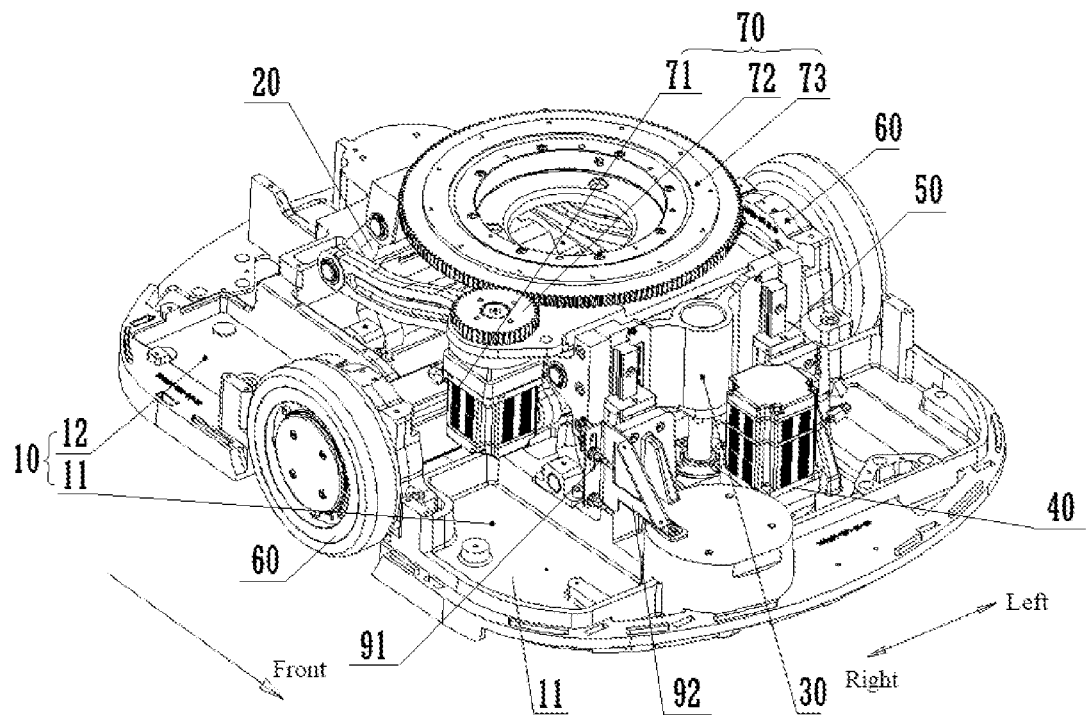
FIG. 1 is a schematic perspective view of some embodiments of a chassis assembly according to the present disclosure.

Various exemplary embodiments of the present disclosure will now be described in detail with reference to the accompanying drawings. The description of the exemplary embodiments is merely illustrative and in no way limits the present disclosure, its application or uses in any way. The present disclosure may be implemented in many different forms and is not limited to the embodiments described herein. These embodiments are provided so that the present disclosure will be thorough and complete, and the scope of the present disclosure is fully conveyed to those skilled in the art. It should be noted that unless specifically stated otherwise, the relative arrangements of parts and steps, compositions of materials, numerical expressions and numerical values set forth in these embodiments are to be interpreted as illustrative only and not as limitative.

As used in the present disclosure, "first", "second" and similar words do not denote any order, quantity, or importance, but are merely used to distinguish the different parts. "comprise", "include" or similar words mean that the element preceding the word covers the elements listed after the word, and does not exclude the possibility that other elements are also covered. Words, such as "up", "down", "left", and "right", are used only to indicate relative positional relationships. When the absolute position of the described object changes, the relative positional relationship may also change accordingly.

In the present disclosure, when it is described that a specific device is located between a first device and a second device, there may or may not be an intervening device between the specific device and the first device or the second device. When it is described that a specific device is connected to another device, the specific device may be directly connected to the other device without an intervening device, or may not be directly connected to the other device but has an intervening device.

All terms (including technical or scientific terms) used in this disclosure have the same meaning as understood by one of ordinary skill in the art to which this disclosure belongs, unless specifically defined otherwise. It should also be understood that terms defined in, for example, general dictionaries should be construed to have meanings consistent with their meanings in the context of the related art and not to be interpreted in an idealized or highly formalized sense unless explicitly defined as such herein.

Techniques, methods, and devices known to those of ordinary skill in the related art may not be discussed in detail, but where appropriate, such techniques, methods, and devices should be considered part of the description.

In some related technologies, an AGV uses a ring gear to drive a gear to rotate, and then the gear drives a lead screw to rotate relative to a screw nut fixedly connected to a chassis, so that the lead screw drives components connected to the lead screw to perform a lifting action. Through research, the inventors have found that the lead screw— screw nut lifting structure requires the lead screw to move vertically relative to the chassis while rotating. In order to drive the lead screw to rotate and avoid the interference of a drive unit to the vertical movement of the lead screw, it is required to use the cooperation of the ring gear and the gear to drive the lead screw to rotate. Since the use of the ring gear will occupy a large space of the chassis, the structure of the AGV is not compact enough, resulting in low space efficiency.

In view of this, embodiments of the present disclosure provide a chassis assembly and an automatic guided vehicle, which can optimize the structure of the chassis assembly and improve the space efficiency.

FIG. 1 is a schematic perspective view of some embodiments of a chassis assembly according to the present disclosure. Referring to FIG. 1, and in conjunction with the structures shown in FIGS. 2-10 respectively, in some embodiments, the chassis assembly includes: a chassis 10, a lifting power assembly and a lifting connecting rod assembly 20. The chassis 10 can be an integral chassis or a split chassis.

The lifting connecting rod assembly 20 is arranged on the chassis 10. The lifting power assembly includes a lifting bracket 30 pivotally connected to one end of the lifting connecting rod assembly 20 and a lifting drive mechanism 40 arranged on the chassis 10 and connected to the lifting bracket 30.

Figure 9:
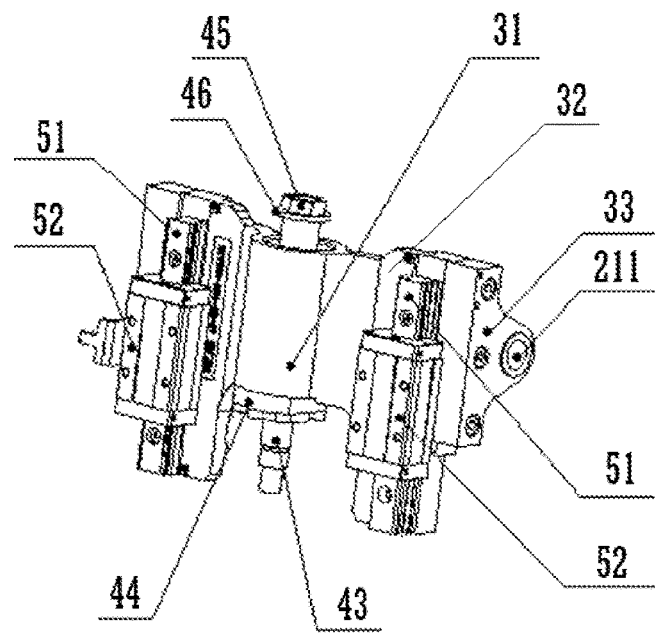
FIG. 9 is a schematic diagram of part of a lifting power assembly in some embodiments of the chassis assembly according to the present disclosure after assembly.
Figure 10:
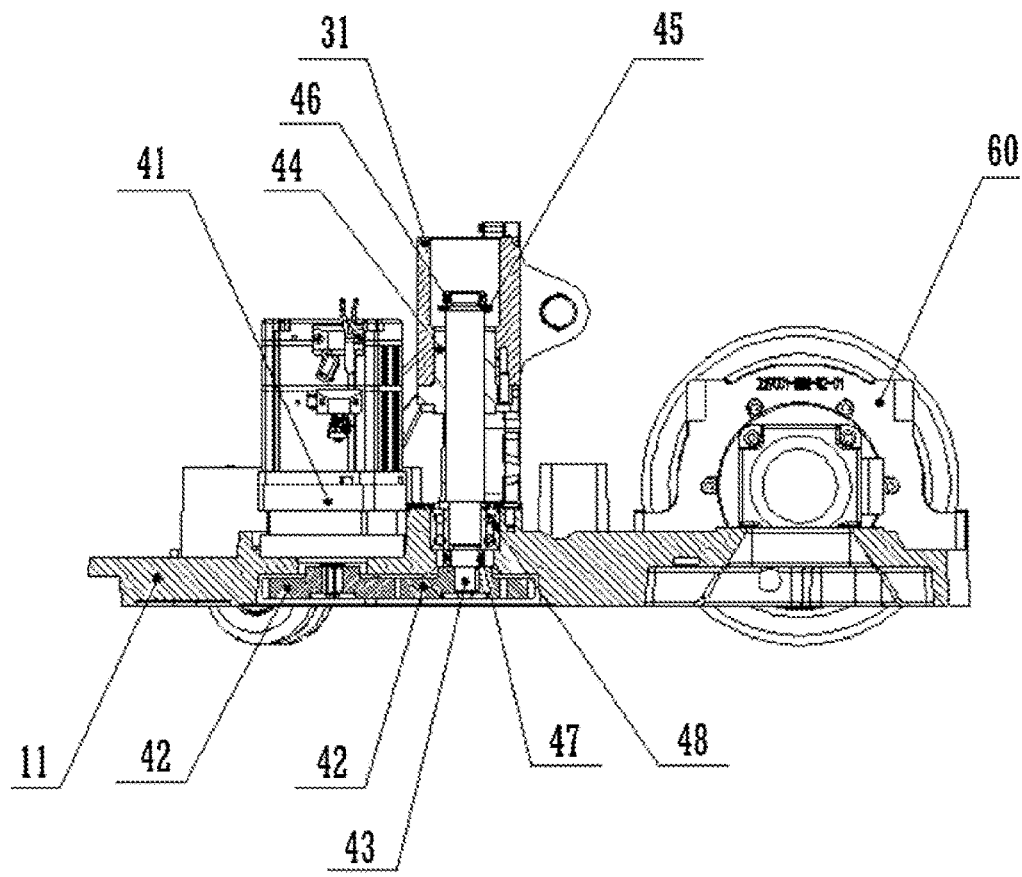
FIG. 10 is a schematic cross-sectional diagram of the lifting power assembly in some embodiments of the chassis assembly according to the present disclosure.

Referring to FIGS. 9 and 10, the lifting bracket 30 includes a sleeve portion 31 having a cylindrical hollow cavity, the lifting drive mechanism 40 includes: a lead screw 43 penetrating through the sleeve portion 31, a screw nut 44 fixed to the sleeve portion 31 and in thread fit with the lead screw 43, and a power output unit drivingly connected to the lead screw 43, and the power output unit is configured to cause the lead screw 43 to rotate to drive the screw nut 44 and the lifting bracket 30 to rise or fall synchronously relative to the chassis 10.

In this embodiment, the lead screw is caused to rotate by the power output unit, and the screw nut and the lifting bracket are driven to synchronously rise or fall relative to the chassis, so that the vertical movement of the lead screw relative to the chassis is not required, and the use of a component such as the ring gear that occupies a large space is avoided, thereby effectively improving the space efficiency of the chassis assembly.

In some related technologies, the lifting and lowering of materials or material carriers is realized by using a connecting rod mechanism in an AGV. Through research, the inventors have found that when the connecting rod mechanism in the AGV lifts a heavy material, the deformation of the connecting rod mechanism may cause the lifted material not to leave the ground completely at the same time, which may cause damage to the ground by the material.

Figure 2:
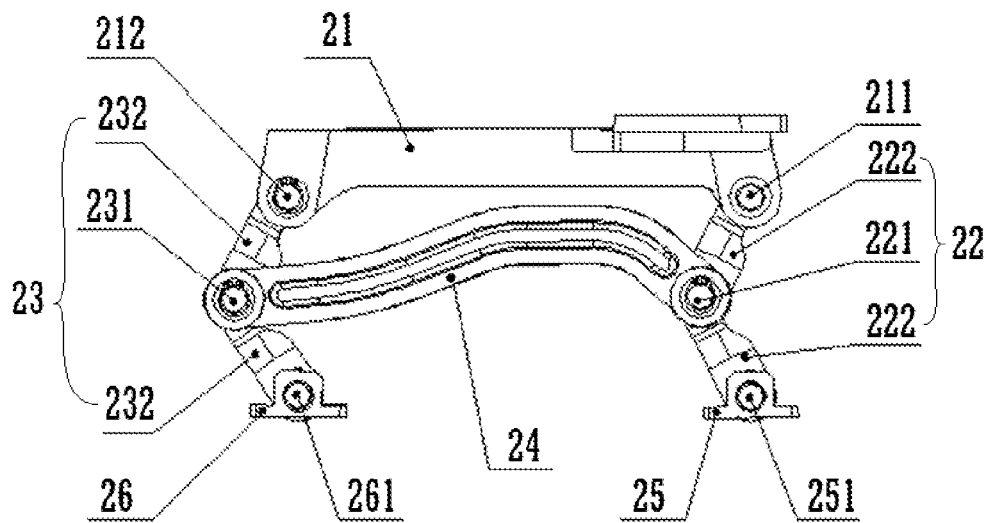
FIG. 2 is a schematic structural diagram of a lifting connecting rod assembly in some embodiments of the chassis assembly according to the present disclosure.
Figure 3:
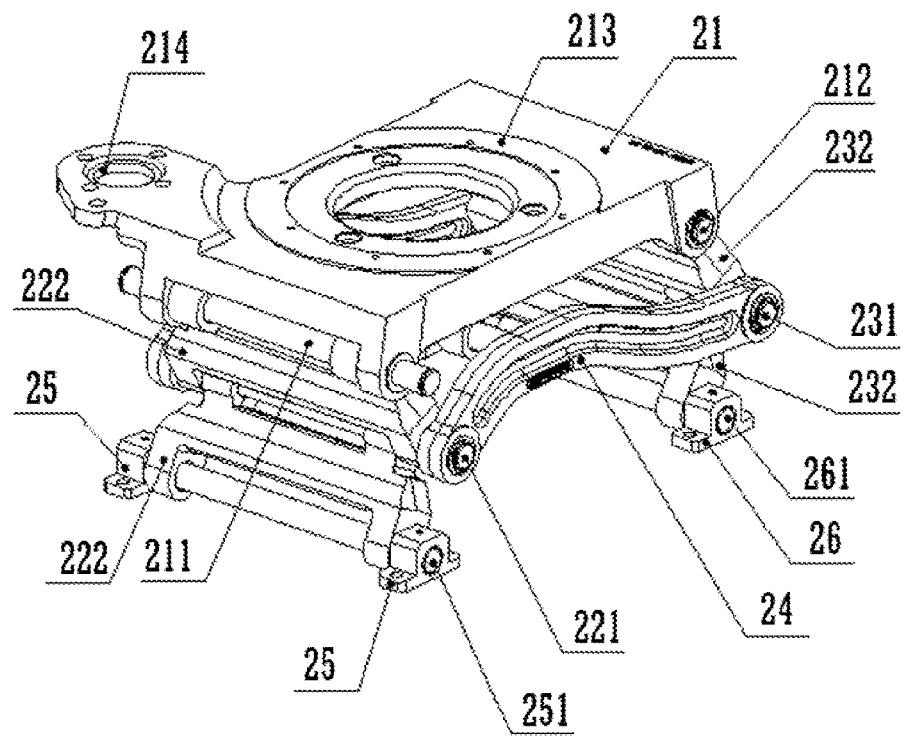
FIG. 3 is a schematic perspective view of the lifting connecting rod assembly in some embodiments of the chassis assembly according to the present disclosure.

In order to improve the material lifting process of the chassis assembly, referring to FIGS. 2 and 3, in some embodiments, the lifting connecting rod assembly 20 includes: a first connecting rod set 22, a second connecting rod set 23, a support base 21 and a push-pull connecting rod 24. The first connecting rod set 22 includes two first connecting rods 222 pivotally connected by a first connecting rod shaft 221 and rotatably connected to the chassis 10. The second connecting rod set 23 includes two second connecting rods 232 pivotally connected by a second connecting rod shaft 231 and rotatably connected to the chassis 10. The support base 21 has a first end pivotally connected to the first connecting rod set 22 and a second end pivotally connected to the second connecting rod set 23. The push-pull rod 24 has one end pivotally connected to the first connecting rod shaft 221 and the other end pivotally connected to the second connecting rod shaft 231.

The lifting bracket is rotatably connected to the first end of the support base 21 and is configured to apply a force to the first end of the support base 21 to cause the first end of the support base 21 to move in a vertical direction and also to drive the second end of the support base 21 to move in the vertical direction through the two first connecting rods 222, the push-pull rod 24 and the two second connecting rods 232.

The push-pull rod 24 can be configured in a linear form or a curve form as required, so as to meet the needs of layout in the chassis and non-interference to other components. A weight-reducing groove can also be formed in the push-pull rod 24 to reduce the overall weight of the chassis assembly.

In FIG. 2, it can be seen that the lifting connecting rod assembly 20 forms an approximate dual-parallelogram structure with a common side with the chassis 10 through the first connecting rod set 22, the second connecting rod set 23, the support base 21 and the push-pull rod 24. When the first end of the support base 21 is driven by the lifting power assembly to rise or fall, the force applied by the lifting power assembly is transferred to the second end of the support base 21 through the two first connecting rods 222 of the first connecting rod set 22, the push-pull rod 24, and the two second connecting rods 232 of the second connecting rod set 23, thereby driving the structure or material supported by the support base 21 to rise or fall. In this way, the support base 21 can rise or fall vertically relative to the chassis 10, meeting the stability requirement during the process of lifting or lowering.

In some embodiments, the material includes a shelf. The shelf carrying goods is often heavy, and the shelf is supported on the site by multiple legs. When a trolley runs below a shelf, the shelf is lifted by the lifting power assembly and the lifting connecting rod assembly. Since the connection between the lifting power assembly and the first end of the support base deviates from the center position of the support base, and when the support base carries the material, the center of gravity of the support base and the material deviates from the first end of the support base, then the second connecting rod set connected to the second end of the support base is subject to a greater force and deformed, which will easily cause the shelf to tilt toward the second end of the support base. When the first end of the support base is lifted, the legs of the shelf near the first end is likely to be lifted earlier than legs near the second end, instead of leaving the ground at the same time, which may easily crush or scratch the ground.

In this embodiment, the length of each second connecting rod 232 is not less than the length of each first connecting rod 222, and the total length of the two second connecting rods 232 is greater than the total length of the two first connecting rods 222. In this way, even if the second connecting rods 232 are subject to a greater force and deformed, the support base 21 can still keep the material balanced when carrying the material, thereby improving the material lifting process of the chassis assembly, and avoiding damage to the ground caused by some materials not leaving the ground completely at the same time when being lifted.

Referring to FIGS. 2 and 3, in some embodiments, the lift connecting rod assembly 20 further includes: a first connecting rod shaft fixing base 25 and a second connecting rod shaft fixing base 26. The first connecting rod shaft fixing base 25 is fixedly arranged on the chassis 10 and is pivotally connected to the first connecting rod set 22 through a first connecting shaft 251. The second connecting rod shaft fixing base 26 is fixedly arranged on the chassis 10, located on a side of the first connecting rod shaft fixing base 25 away from the lifting power assembly, and pivotally connected to the second connecting rod set 23 through a second connecting shaft 261.

The lifting power assembly is located adjacent to the first connecting rod shaft fixing base 25 and far away from the second connecting rod shaft fixing base 26 and realizes an active and follow-up driving relationship, which can achieve more compact layout space on the chassis 10 and improve space efficiency. The lifting power assembly is located inside an included angle formed by the two first connecting rods 222 to avoid interference to the movement of the first connecting rods 222.

In FIGS. 2 and 3, the first end of the support base 21 is pivotally connected to the first connecting rod set 22 through a third connecting rod shaft 211, and the lifting bracket 30 is pivotally connected to the third connecting rod shaft 211, thereby realizing rotatable connection between the lifting bracket 30 and the first end of the support base 21. In this way, by lifting the third connecting rod shaft 211, the lifting bracket 30 can drive the first end of the support base 21 and the top end of the first connecting rod set 22 to lift synchronously.

In the above embodiment, the length of each second connecting rod 232 may be equal to or greater than the length of each first connecting rod 222, but the total length of the two second connecting rods 232 needs to be greater than the total length of the two first connecting rods 222. In this way, the second connecting rods 232 with a greater overall length can be matched with the first connecting rods 222 with a shorter overall length even if greater deformation occurs when the second connecting rods 232 are stressed, thereby keeping the material balanced. Optionally, a difference between the length of each second connecting rod 232 and the length of each first connecting rod 222 is 2 mm to 4 mm, that is, the second connecting rod 232 is slightly longer than the first connecting rod 222, so that the formed approximate dual-parallelogram structure is more balanced overall.

Based on the above-mentioned length relationship between the first connecting rod set 22 and the second connecting rod set 23, a distance between the first connecting rod shaft 221 and the second connecting rod shaft 231 can be made greater than a distance between the first connecting shaft 251 and the second connecting shaft 261. In this way, when the support base 21 is not loaded with a material, the second end of the support base 21 is slightly tilted upward relative to the first end, and when the support base 21 is loaded with a material, the second end of the support base 21 can maintain a horizontal alignment relationship with the first end. For example, according to the length relationship between the second connecting rod 232 and the first connecting rod 222, the difference between the distance between the first connecting rod shaft 221 and the second connecting rod shaft 231 and the distance between the first connecting shaft 251 and the second connecting shaft 261 can be set as 1.8 mm to 3.8 mm.

In addition, in FIGS. 2 and 3, the second connecting rod set 23 can be pivotally connected to the second end of the support base 21 through a fourth connecting rod shaft 212, and a distance between the fourth connecting rod shaft 212 and the third connecting rod shaft 211 may be equal to a distance between the first connecting shaft 251 and the second connecting shaft 261.

Referring to FIGS. 1-3, in some embodiments, the support base 21 may include a slewing bearing connection portion 213 and a slewing power assembly installation portion 214. Both the slewing bearing connection portion 213 and the slewing power assembly installation portion 214 can be located at the top of the support base 21. The chassis assembly further includes a rotating mechanism 70 connected to the lifting connecting rod assembly 20 and configured to realize the slewing action of the material carried by the chassis assembly.

Specifically, the rotating mechanism 70 may include a slewing bearing 73, a driving gear 72 engaged with the slewing bearing 73, and a third motor 71 drivingly connected to the driving gear 72. The slewing bearing 73 is rotatably arranged on the slewing bearing connection portion 213, and the driving gear 72 and the third motor 71 are mounted on the slewing power assembly installation portion 214. The driving gear 72 can be located over the slewing power assembly installation portion 214, and the third motor 71 can be located below the support base 21, so as to effectively utilize the space below the support base 21. When the third motor 71 rotates, it can drive the driving gear 72 to rotate, and then the driving gear 72 drives the slewing bearing 73 to perform a slewing motion. In some other embodiments, the chassis assembly may not include a rotating mechanism.

Referring to FIGS. 1 and 4-6, in some embodiments, the chassis 10 is a split structure, i.e., a split chassis. The chassis 10 includes a first chassis split portion 11 and a second chassis split portion 12. According to the normal running direction of a trolley formed by the chassis assembly, the first chassis split portion 11 can be used as a front chassis split portion, and the second chassis split portion 12 can be used as a rear chassis split portion, and vice versa is also feasible.

The first chassis split portion 11 is pivotally connected to the second chassis split portion 12 through a chassis shaft 13. The first connecting rod shaft fixing base 25 is fixedly arranged on the first chassis split portion 11, and the second connecting rod shaft fixing base 26 is fixedly arranged on the second chassis split portion 12. In this way, when a field where the chassis assembly runs is uneven, the rotation of the first chassis split portion 11 relative to the second chassis split portion 12 can realize the reliable support of the field to the chassis assembly, avoiding the instability risk of local suspension of the chassis assembly. Moreover, the lifting connecting rod assembly is connected to different split portions of the chassis through the first connecting rod shaft fixing base 25 and the second connecting rod shaft fixing base 26, so that the lifting connecting rod assembly can be adjusted accordingly with the swing of the chassis split portions as the ground of the running field changes, ensuring the stability of the material during transportation.

Figure 4:
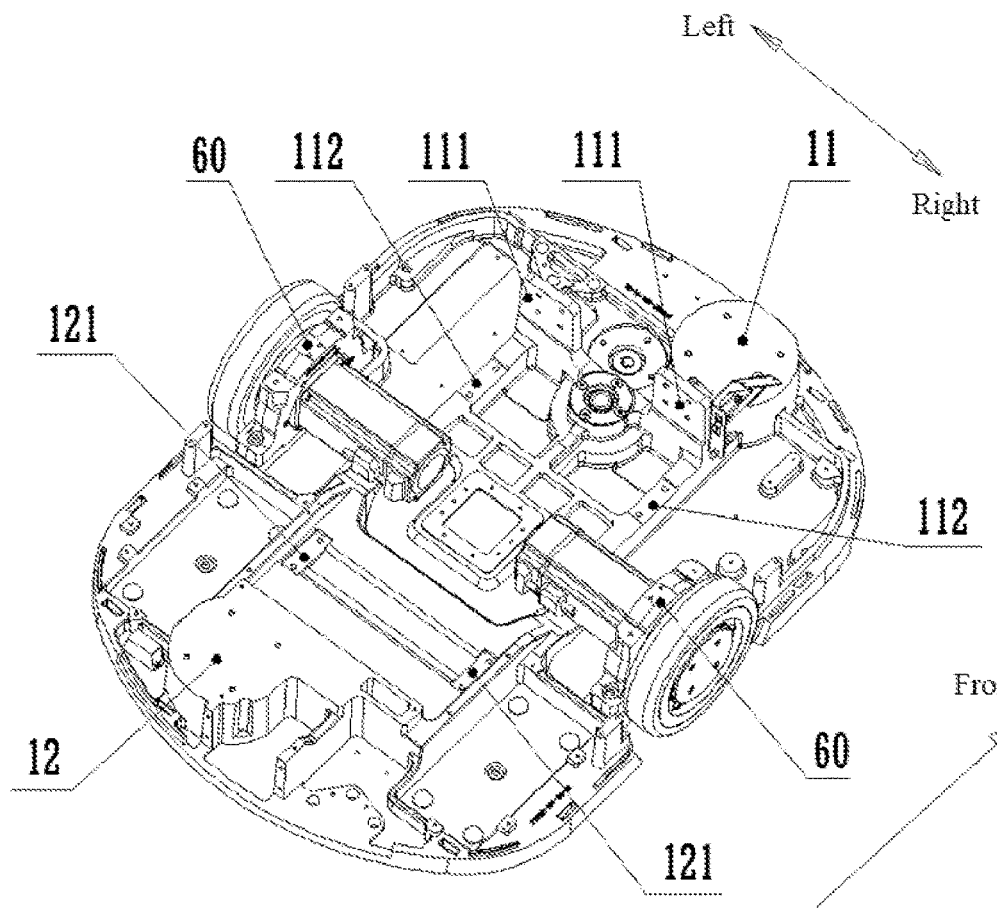
FIG. 4 is a schematic structural diagram of assembly of a chassis and driving wheel trains in some embodiments of the chassis assembly according to the present disclosure.
Figure 5:
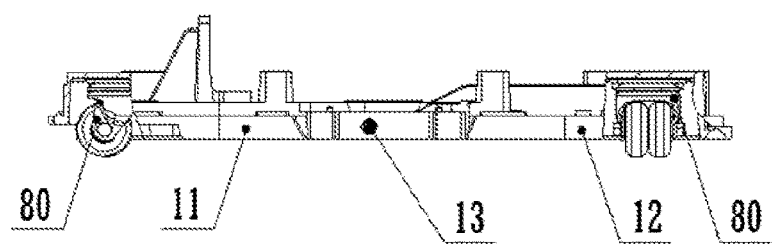
FIG. 5 is a schematic structural diagram of assembly of the chassis and a universal wheel set in some embodiments of the chassis assembly according to the present disclosure.
Figure 6:
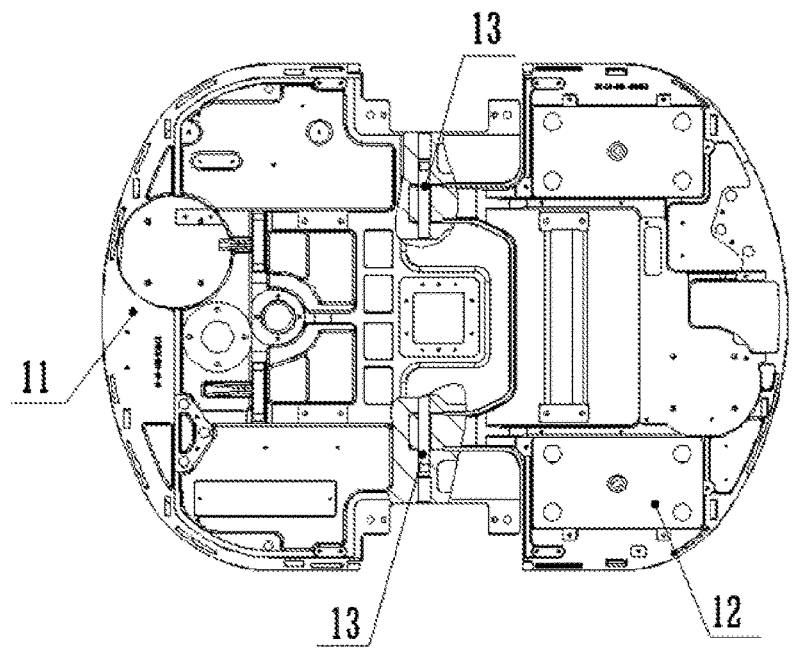
FIG. 6 is a schematic structural diagram of the chassis in some embodiments of the chassis assembly according to the present disclosure under a top view.

Referring to FIGS. 4 and 5, in some embodiments, the chassis assembly further includes: two sets of driving wheel trains 60 and a universal wheel set 80. Two sets of driving wheel trains 60 are fixedly arranged on the chassis 10 and are driven independently. The two sets of driving wheel trains 60 can be respectively located on the left and right sides of the chassis 10. The axes of the driving wheels 64 of the two sets of driving wheel trains 60 are coincident and are parallel to a chassis shaft 13. In this way, by independently driving the driving wheel trains 60 on the left and right sides, multiple motion modes, such as traveling forward, backward, and steering, of the chassis assembly can be realized, satisfying the work needs of the trolley using the chassis assembly.

The universal wheel set 80 is floatably arranged below the chassis 10. The universal wheel set 80 can include: at least two universal wheels, having one part located below the first chassis split portion 11 and the other part located below the second chassis split portion 12. In this way, different parts of the split chassis can move below the support of the universal wheels.

The arrangement of the driving wheel trains and the universal wheel set in this embodiment, compared with a arrangement pattern of the related art in which the driving wheels float relative to the chassis and the universal wheel is fixed on the chassis, can increase the positive pressure between the driving wheel trains and the field as the load caused by the material increases, thereby ensuring effective friction between the driving wheel trains and the field, and avoiding the field slippage problem caused by the constant positive pressure after the load increases in the related art.

Figures 7, 8:
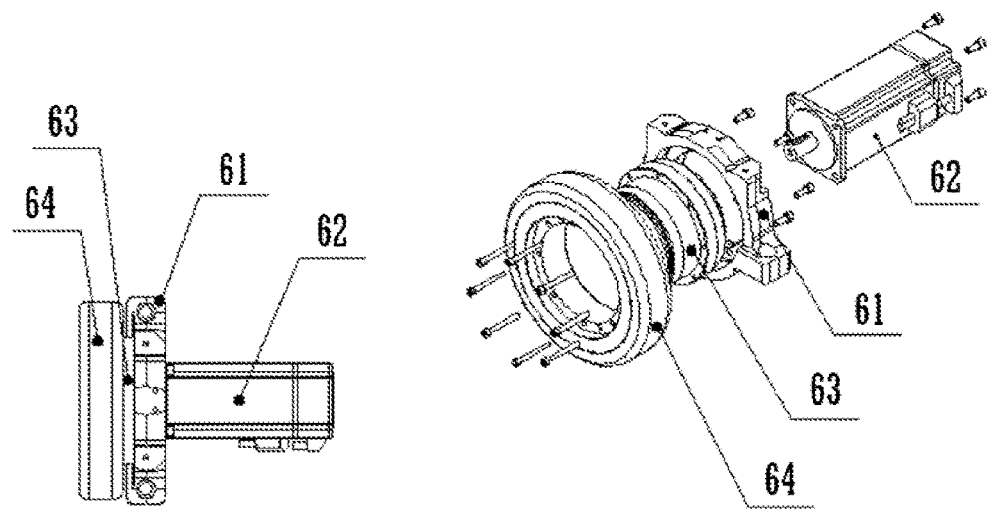
FIG. 7 is a schematic structural diagram of the driving wheel train in some embodiments of the chassis assembly according to the present disclosure.
FIG. 8 is a schematic exploded diagram of the driving wheel train in some embodiments of the chassis assembly according to the present disclosure.

Specifically, referring to FIGS. 4, 7 and 8, in some embodiments, the driving wheel train 60 includes: a first base 61, a first motor 62, a hub reducer 63 and a driving wheel 64. The first base 61 is fixedly connected to the chassis 10. The first motor 62 is fixedly connected to the first base 61. The hub reducer 63 is connected to the first base 61 and connected to a power output end of the first motor 62. The driving wheel 64 is fixedly connected to the hub reducer 63. Through the fixed connection between the first base 61 and the chassis 10, a reliable transfer relationship of a positive pressure between the driving wheel trains 60 and the chassis 10.

Referring to FIGS. 1, 9 and 10, in some embodiments, the lifting power assembly further includes: a linear guide mechanism 50. The linear guide mechanism 50 is arranged between the lifting bracket 30 and the chassis 10 and configured to guide the lifting bracket 30 to rise or fall in a straight line.

In FIG. 9, the lifting bracket 30 includes not only the sleeve portion 31, but also two flank portions 32 and two lifting lugs 33. The two flank portions 32 are fixedly connected to or integrally formed with the sleeve portion 31, and are located on two sides of the sleeve portion 31. The two flank portions can be designed as the shape of a plate lying in the same plane, and are respectively located on the left and right sides of the sleeve portion 31. The two lifting lugs 33 are respectively fixedly connected to or integrally formed with the two flank portions 32 and pivotally connected to one end of the lifting connecting rod assembly 20 through the third connecting rod shaft 211.

Referring to FIG. 9, in some embodiments, the linear guide mechanism 50 includes: two linear rails 51 and two sets of linear sliders 52. The two linear rails 51 are respectively fixedly arranged on the two flank portions 32. The two sets of linear sliders 52 are both fixedly connected with the chassis 10 and respectively in guiding fit with the two linear rails 51. The linear guide mechanism 50 can use the wider flank portion 32 to guide the movement of the lifting bracket 30 and realize a more stable lifting process through the cooperation structure of two sets of linear rails 51 and linear sliders 52.

Referring to FIGS. 9 and 10, in some embodiments, the power output unit includes: a second motor 41 and a transmission gear train 42. The second motor 41 is fixedly connected to the chassis 10. The transmission gear train 42 is arranged in the chassis 10. An input end of the transmission gear train 42 is connected to a power output shaft of the second motor 41, and an output end of the transmission gear train 42 is connected with the lead screw 43. The number of transmission gears in the transmission gear train 42 can be set as required, for example, the transmission gear train 42 in FIG. 10 includes two intermeshing transmission gears.

Referring to FIG. 10, the lead screw 43 is penetrating through the sleeve portion 31 and the output end of the transmission gear train 42 is connected with the lead screw 43. The screw nut 44 is fixed to the sleeve portion 31 and in thread fit with the lead screw 43. By integrating part of structures in the lifting drive mechanism 40 (such as the second motor 41 and the transmission gear train 42) into the chassis 10, other parts of the lifting drive mechanism are simplified, which not only saves the internal space of the chassis, but also reduces the cost of the entire vehicle.

In FIG. 10, the lifting drive mechanism 40 further includes: a lead screw locking nut 47, an angular contact bearing 48, an anti-off pressing sheet 45 and an upper locking nut 46. The lead screw 43 can be locked with the transmission gear train 42 through the lead screw locking nut 47, and forms a smooth rotatable relationship with the chassis 10 through the angular contact bearing 48. The top of the leading screw 43 can lock the anti-off pressing sheet 45 by the upper locking nut 46, and the area of the anti-off pressing sheet 45 is greater than the cross-sectional area of the lead screw 43. In this way, when the lead screw 43 moves relative to the screw nut 44 until the anti-off pressing sheet 45 abuts against the screw nut 44, the movement between the lead screw 43 and the screw nut 44 is limited, thereby limiting the maximum stroke during relative movement of the lead screw 43 and the screw nut 44.

In order to make the lifting or lowering of the lifting power assembly more accurate, in FIG. 1, a limit sensor 91 that can move synchronously with the lifting bracket 30 can be arranged on the lifting bracket 30, and a bracket 92 that cooperates with the limit sensor 91 can be fixed on the chassis. The bracket 92 may have a long slot extending vertically, and the limit sensor 91 penetrates through the long slot, and slides in the long slot when the lifting bracket 30 is lifted or lowered. When the limit sensor 91 senses the upper slot wall or the lower slot wall of the long slot (for example, touches the upper slot wall or the lower slot wall of the long slot), the lifting power assembly stops lifting or lowering.

In FIG. 4, in order to facilitate the installation of the chassis assembly, a slider installation portion 111 for installing two sets of linear sliders 52 can be pre-arranged on the upper side of the chassis 10. The slider installation portion 111 can be designed as a vertical plate structure perpendicular to the surface of the chassis, so that the linear sliders 52 can be fixedly connected to the chassis in a reliable manner while occupying less space. In addition, for a split chassis, the upper side of the first chassis split portion 11 can be provided with a first connecting rod fixing position 112 for connecting the first connecting rod shaft fixing base 25, and the upper side of the second chassis split portion 12 can be provided with a second connecting rod fixing position 121 for connecting the second connecting rod shaft fixing base 26.

The embodiments of the above-mentioned chassis assembly can be used in various trolleys for material transportation, such as automatic guided vehicles. Therefore, an embodiment of the present disclosure also provides an automatic guided vehicle, including any of the embodiments of the chassis assembly described above.

So far, the embodiments of the present disclosure have been described in detail. Some details known in the art have not been described in order to avoid obscuring the concept of the present disclosure. Based on the above description, those skilled in the art can fully understand how to implement the technical solutions disclosed herein.

While some specific embodiments of this disclosure have been described in detail by way of examples, those skilled in the art will appreciate that the above examples are provided for illustration only, and are not intended to limit the scope of this disclosure. Those skilled in the art should understand that, without departing from the scope and spirit of this disclosure, the above embodiments can be modified or some technical features can be equivalently replaced. The scope of this disclosure is defined by the appended claims.

What is claimed is:

1. A chassis assembly, comprising:
   a chassis;
   a lifting connecting rod assembly arranged on the chassis; and
   a lifting power assembly, comprising a lifting bracket pivotally connected to one end of the lifting connecting rod assembly and a lifting drive mechanism arranged on the chassis and connected to the lifting bracket,
   wherein the lifting bracket comprises a sleeve portion having a cylindrical hollow cavity; the lifting drive mechanism comprises: a lead screw penetrating through the sleeve portion, a screw nut fixed to the sleeve portion and in thread fit with the lead screw, and a power output unit drivingly connected to the lead screw; and the power output unit is configured to cause the lead screw to rotate to drive the screw nut and the lifting bracket to rise or fall synchronously relative to the chassis.

2. The chassis assembly according to claim 1, wherein the lifting connecting rod assembly comprises:
   a first connecting rod set, comprising two first connecting rods pivotally connected by a first connecting rod shaft and rotatably connected to the chassis;
   a second connecting rod set, comprising two second connecting rods pivotally connected by a second connecting rod shaft and rotatably connected to the chassis;
   a support base having a first end pivotally connected to the first connecting rod set and a second end pivotally connected to the second connecting rod set; and
   a push-pull rod having one end pivotally connected to the first connecting rod shaft and the other end pivotally connected to the second connecting rod shaft;
   wherein the lifting bracket is rotatably connected to the first end of the support base and is configured to apply a force to the first end of the support base to cause the first end of the support base to move in a vertical direction and also to drive the second end of the support base to move in the vertical direction through the two first connecting rods, the push-pull rod and the two second connecting rods; a length of each second connecting rod is not less than that of each first connecting rod, and a total length of the two second connecting rods is greater than that of the two first connecting rods.

3. The chassis assembly according to claim 2, wherein the lifting connecting rod assembly further comprises:
   a first connecting rod shaft fixing base, fixedly arranged on the chassis and pivotally connected to the first connecting rod set through a first connecting shaft; and
   a second connecting rod shaft fixing base, fixedly arranged on the chassis, located on a side of the first connecting rod shaft fixing base away from the lifting power assembly, and pivotally connected to the second connecting rod set through a second connecting shaft.

4. The chassis assembly according to claim 3, wherein a distance between the first connecting rod shaft and the second connecting rod shaft is greater than a distance between the first connecting shaft and the second connecting shaft.

5. The chassis assembly according to claim 4, wherein a difference between the distance between the first connecting rod shaft and the second connecting rod shaft and the distance between the first connecting shaft and the second connecting shaft is 1.8 mm to 3.8 mm.

6. The chassis assembly according to claim 3, wherein the chassis is a split structure comprising a first chassis split portion and a second chassis split portion, the first chassis split portion is pivotally connected to the second chassis split portion through a chassis shaft; the first connecting rod shaft fixing base is fixedly arranged on the first chassis split portion, and the second connecting rod shaft fixing base is fixedly arranged on the second chassis split portion.

7. The chassis assembly according to claim 6, further comprising:
   two sets of driving wheel trains, fixedly arranged on the chassis and driven independently; and
   a universal wheel set, floatably arranged below the chassis.

8. The chassis assembly according to claim 7, wherein the driving wheel train comprises:
   a first base, fixedly connected to the chassis;
   a first motor, fixedly connected to the first base;
   a hub reducer, connected to the first base and connected to a power output end of the first motor; and
   a driving wheel, fixedly connected to the hub reducer.

9. The chassis assembly according to claim 7, wherein axes of the driving wheels of the two sets of driving wheel trains are coincident and are parallel to the chassis shaft.

10. The chassis assembly according to claim 7, wherein the universal wheel set comprises:
    at least two universal wheels, having one part located below the first chassis split portion and the other part located below the second chassis split portion.

11. The chassis assembly according to claim 2, wherein the first end of the support base is pivotally connected to the first connecting rod set through a third connecting rod shaft, and the lifting bracket is pivotally connected to the third connecting rod shaft, so as to realize a rotatable connection between the lifting bracket and the first end of the support base.

12. The chassis assembly according to claim 2, wherein a difference between the length of each second connecting rod and the length of each first connecting rod is 2 mm to 4 mm.

13. The chassis assembly according to claim 2, further comprising:
    a rotating mechanism, connected to the lifting connecting rod assembly and configured to realize a slewing action of a material carried by the chassis assembly.

14. The chassis assembly according to claim 13, wherein the rotating mechanism comprises:
    a slewing bearing, rotatably arranged at a top of the support base;
    a driving gear, engaged with gear teeth of the slewing bearing and mounted at the top of the support base; and
    a third motor, drivingly connected to the driving gear and mounted below the support portion.

15. The chassis assembly according to claim 1, wherein the lifting bracket further comprises:
    two flank portions, fixedly connected to or integrally formed with the sleeve portion and located on two sides of the sleeve portion; and
    two lifting lugs respectively fixedly connected to or integrally formed with the two flank portions and pivotally connected to one end of the lifting connecting rod assembly through the third connecting rod shaft.

16. The chassis assembly according to claim 15, wherein the lifting power assembly further comprises:
    a linear guide mechanism, arranged between the lifting bracket and the chassis and configured to guide the lifting bracket to rise or fall in a straight line.

17. The chassis assembly according to claim 16, wherein the linear guide mechanism comprises:
  two linear rails, respectively fixedly arranged on the two flank portions; and
  two sets of linear sliders, both fixedly connected with the chassis and respectively in guiding fit with the two linear rails.

18. The chassis assembly according to claim 1, wherein the power output unit comprises:
  a second motor, fixedly connected to the chassis; and
  a transmission gear train, arranged in the chassis;
  wherein an input end of the transmission gear train is connected with a power output shaft of the second motor, and an output end of the transmission gear train is connected with the lead screw.

19. An automatic guided vehicle, comprising:
  the chassis assembly according to claim 1.

* * * * *